(12) United States Patent  (10) Patent No.: US 7,918,484 B2
Braun et al.  (45) Date of Patent: Apr. 5, 2011

(54) VEHICLE BODY SEAL FOR A STEERING COLUMN LEADTHROUGH

(75) Inventors: Markus Braun, Köln (DE); Joachim Heidel, Kassel (DE); Birger Assmann, Burscheid (DE); Dirk Sickert, Bruehl (DE)

(73) Assignee: Ford Global Technologies, Dearborn, MI (US)

( * ) Notice: Subject to any disclaimer, the term of this patent is extended or adjusted under 35 U.S.C. 154(b) by 200 days.

(21) Appl. No.: 12/197,670

(22) Filed: Aug. 25, 2008

(65) Prior Publication Data

US 2009/0001673 A1 Jan. 1, 2009

Related U.S. Application Data

(63) Continuation of application No. PCT/DE2007/000311, filed on Feb. 14, 2007.

(30) Foreign Application Priority Data

Feb. 25, 2006 (DE) .......................... 10 2006 008 849

(51) Int. Cl.
*B62D 1/16* (2006.01)
(52) U.S. Cl. ........ 280/779; 280/780; 180/90.6; 296/192
(58) Field of Classification Search .................. 280/771, 280/779, 780; 180/78, 90, 90.6; 296/192
See application file for complete search history.

(56) References Cited

U.S. PATENT DOCUMENTS

| | | | | |
|---|---|---|---|---|
| 4,840,386 A | * | 6/1989 | Peitsmeier et al. | 277/636 |
| 4,895,391 A | * | 1/1990 | Groat | 280/779 |
| 5,082,078 A | * | 1/1992 | Umeda et al. | 180/90 |
| 5,180,189 A | * | 1/1993 | Moreno | 280/779 |
| 5,813,288 A | * | 9/1998 | Simonetti | 74/492 |
| 5,816,615 A | * | 10/1998 | Dupont et al. | 280/780 |
| 6,056,297 A | * | 5/2000 | Harkrader et al. | 277/634 |
| 6,328,315 B1 | * | 12/2001 | Hebenstreit | 277/634 |
| 6,695,374 B1 | * | 2/2004 | Gebreselassie et al. | 296/24.3 |
| 7,272,989 B2 | * | 9/2007 | Schuh | 74/492 |
| 2004/0256849 A1 | * | 12/2004 | Suzuki et al. | 280/779 |
| 2005/0218642 A1 | * | 10/2005 | Yamaguchi et al. | 280/779 |
| 2006/0108782 A1 | * | 5/2006 | Kanazawa et al. | 280/779 |
| 2007/0145731 A1 | * | 6/2007 | Ikeda et al. | 280/775 |
| 2007/0205033 A1 | * | 9/2007 | Hanson et al. | 180/90.6 |

FOREIGN PATENT DOCUMENTS

GB 2 343 718 * 5/2000

* cited by examiner

*Primary Examiner* — Paul N. Dickson
*Assistant Examiner* — George D. Spisich
(74) *Attorney, Agent, or Firm* — Angela M. Brunetti; Fredrick Owens

(57) ABSTRACT

A seal system (9) for sealing an opening (4) which leads into an interior space of a motor vehicle that receives a steering housing (8). The seal system (9) has at least one guide channel (14) that opens into a receiving region (17) for receiving at least one lug (10) which is arranged on the steering housing (8), with the result that the seal system (9) can be connected in a frictionally locking manner to the steering housing (8) through a locking element (24) in the receiving region (17).

18 Claims, 3 Drawing Sheets

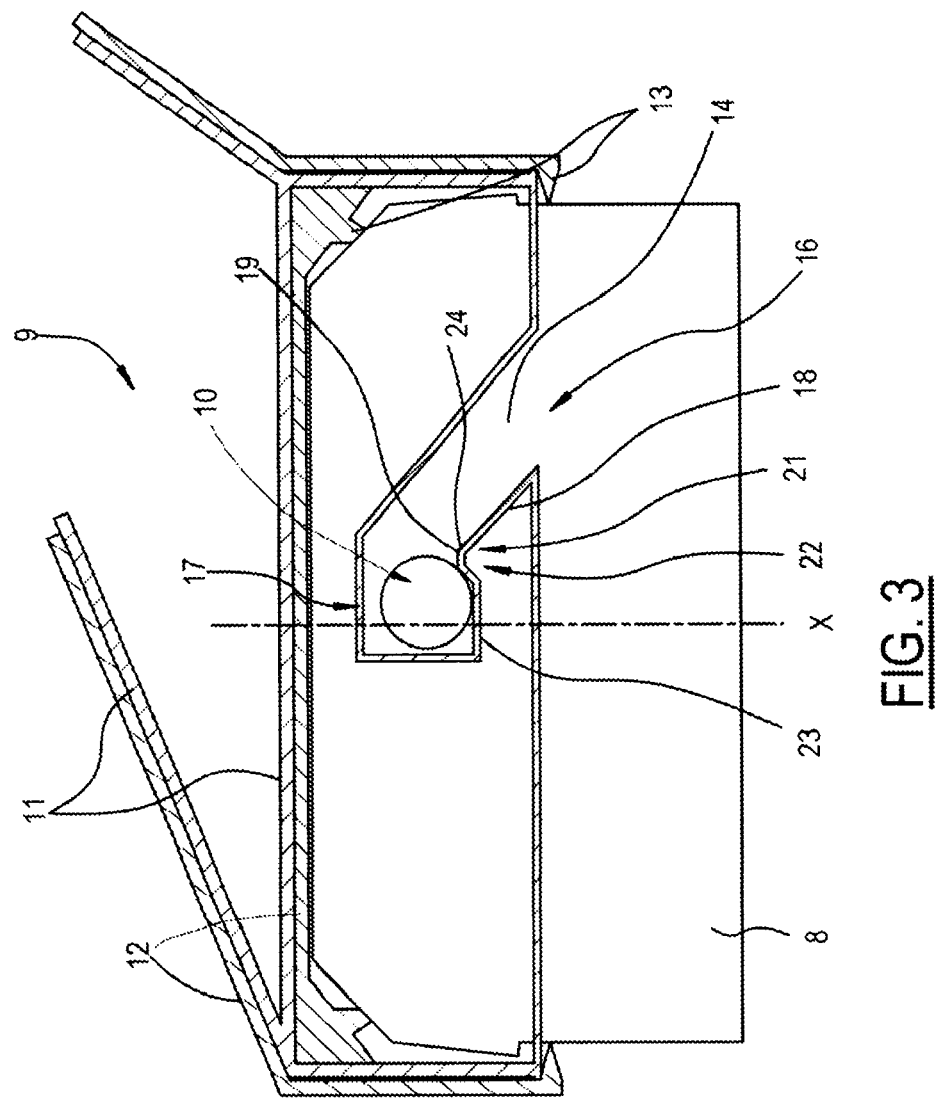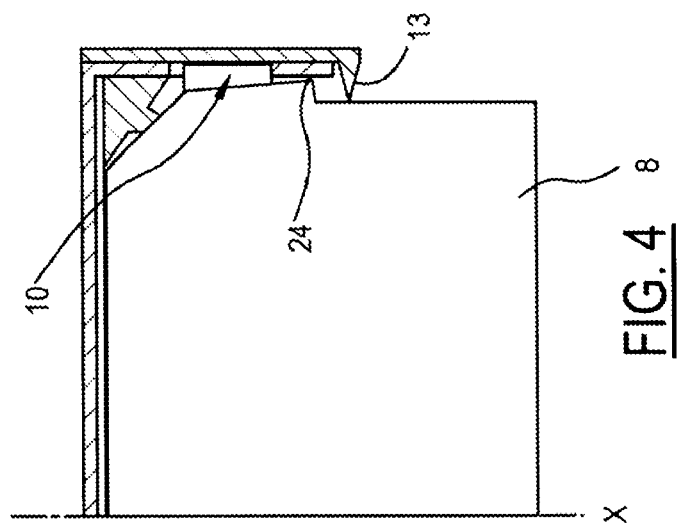

VEHICLE BODY SEAL FOR A STEERING COLUMN LEADTHROUGH

CROSS REFERENCE TO RELATED APPLICATIONS

The inventive subject matter is a continuation of PCT Application No. PCT/DE2007/000311 filed on Feb. 14, 2007 which claims priority to and is also described in DE 102006008849.2, filed Feb. 25, 2006, whose subject matter is incorporated herein by reference and provides the basis for a claim of priority of invention under 35 U.S.C. §120 and 35 U.S.C. §365(c).

TECHNICAL FIELD

The invention relates to a vehicle body seal and more particularly to a vehicle body seal a steering housing.

BACKGROUND

Seal systems of this type are known, for example, for leading steering devices or steering columns through a bulkhead between an engine compartment and the vehicle interior of a motor vehicle. The opening is normally situated in the footwell region on the driver side of the motor vehicle. This opening has to be sealed, in order that environmental influences such as water, noise or the like cannot act on the driver or pass into the interior.

For this purpose, seals have previously been used which are configured as annular seals, that is to say have an opening in the center, through which a steering gear extension or a pinion shaft is guided. The seal itself is in engagement with the bulkhead. The seal can be plugged onto the extension or onto the pinion shaft.

DE 25 13 050 discloses a steering column switch for motor vehicles. A bearings sleeve which carries projections which are distributed on the circumference is arranged on the switch housing. The projections can be inserted into L-shaped bayonet closure receptacles on the end side of a steering tube and can be fixed by rotation of the bearing sleeve. A latching spring having a latching projection is cut out on the bearing sleeve, which latching projection latches into an aperture of the steering tube after rotation of the bearing sleeve.

DE 39 23 982 A1 relates to an energy absorbing device on the steering device of a motor vehicle having a thrust ring. A guide tube is latched to a bearing housing in the manner of a bayonet closure.

DE 196 32 431 deals with an arrangement for sealing an opening in a vehicle body wall, through which the pinion shaft of a steering gear is guided. The seal arrangement has substantially a bellows, a guide body and a corresponding body. The guide body and the corresponding body are coupled to one another in the manner of a bayonet.

It is a disadvantage in the known arrangement that the most extreme care has to be taken when plugging on the seal per se, since it has to be placed exactly on the steering linkage, in order that the opening can be sealed correctly. Furthermore, it is disadvantageous that it is possible for the seal to slip on the linkage during the operation of the vehicle, with the result that insufficient sealing effects can occur. For example, water can then enter the interior.

SUMMARY OF THE INVENTION

The vehicle body seal for a steering column leadthrough has at least one guide channel which is assigned to the seal system and opens into a receiving region for receiving at least one lug which is arranged on the steering housing, with the result that the seal system can be connected in a frictionally locking manner to the steering housing, the receiving region having a locking element.

In the context of the invention, a frictionally locking connection is considered to be a connection which prevents undesired release of the two connection partners which are in mutual engagement. For the intentional release of the connection, the two connection partners first of all have to be brought out of engagement, with the result that the connection can be released without destruction.

The guide channel which guarantees a defined application path makes it possible in a simple way to apply the seal or the seal system onto the steering housing. The seal system is fixed in a positionally stable manner on account of the frictionally locking connection, as a result of which slipping is avoided even after a long operating time of the motor vehicle.

BRIEF DESCRIPTION OF THE DRAWINGS

FIG. 3 shows a basic view of a seal system of the inventive subject matter;

FIG. 4 shows a sectional view along the line X-X from FIG. 3, and

Identical parts are provided with the same designations in the different figures, for which reason they are also described only once as a rule.

DETAILED DESCRIPTION

The invention is based on the object of improving a seal system with simple means such that the seal system remains in a fixed position even after a long operating time of the motor vehicle. Ease of assembly is intended as well.

Figure 1:
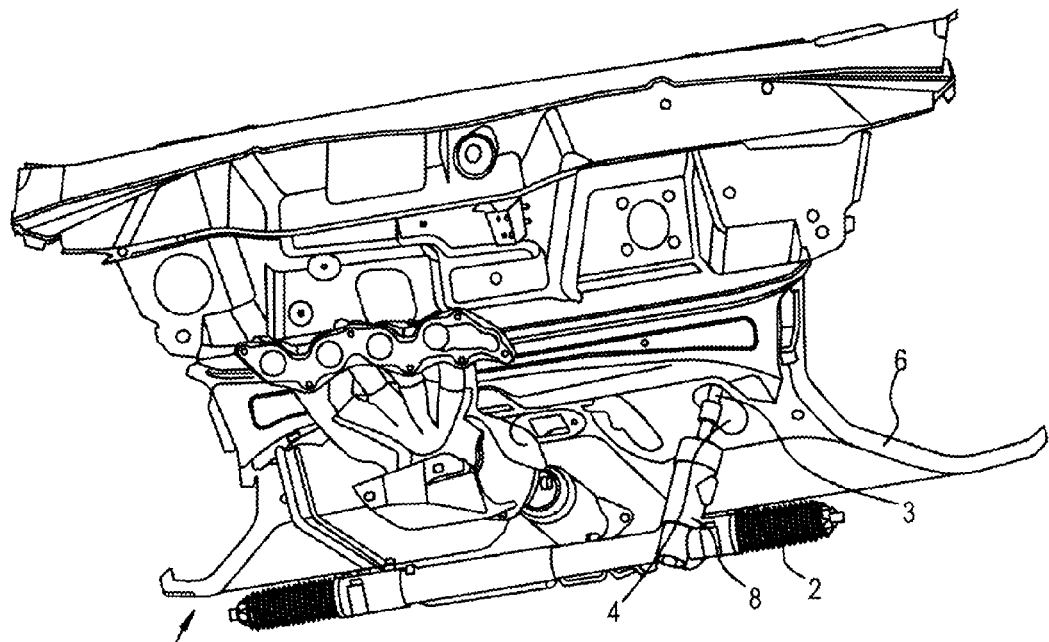
FIG. 1 shows a perspective view into an engine compartment from below in the direction of a bulkhead.

FIG. 1 shows a perspective view of an engine compartment 1 of a motor vehicle. A steering gear 2 is guided by means of a pinion shaft 3 through an opening 4 in a bulkhead 6 into an interior space (not shown) of the motor vehicle. The bulkhead 6 divides the engine compartment 1 from the interior space (not shown) and can also be denoted as a sprayboard. The pinion shaft 3 has a thickened portion 7 shown in FIG. 2. The thickened portion 7 is arranged somewhat below the opening 4 as shown. Referring again to FIG. 1, the pinion shaft 3 transmits steering movements (for example, a mechanical rotation) of a steering wheel (not shown) to the steering gear 2. The pinion shaft 3 opens with its lower end into a steering housing 8. The steering housing 8 is manufactured, for example, from steel.

Figure 2:
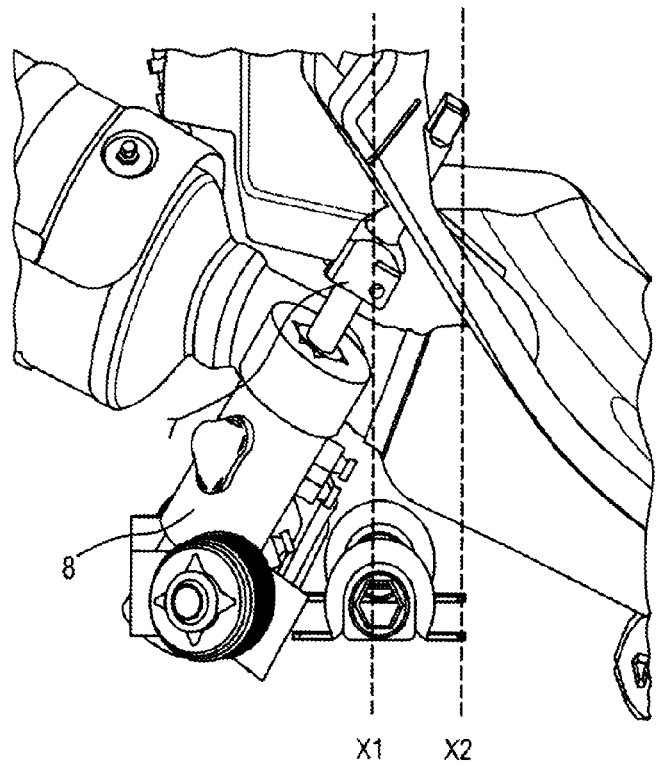
FIG. 2 shows a perspective illustration as an enlarged detail from FIG. 1.

As can be gathered clearly from FIG. 2, the opening 4 is configured with an exemplary opening magnitude which shown by way of example by the two lines X1 and X2.

FIG. 3 shows a basic view of the seal system 9 of the inventive subject matter for sealing the opening 4 of the bulkhead 6 with respect to the steering housing 8.

The steering housing 8 is shown in a side view in FIG. 3 and has at least one lateral lug 10. On the diametrically opposite side (not shown) of the steering housing 8, a lug can likewise be arranged. The lug 10 has a height of approximately two to three millimeters, it is possible for the dimensions of the two lugs 10 to be different. For example, the lugs 10 can be of cylindrical configuration with different diameters and heights.

The seal system 9 has a frame 11 which is surrounded by a seal 12. The seal 12 can be applied to the frame 11, for example, by way of injection molding technology and consists, for example, of a rubber-like plastic, preferably a thermoplastic elastomer or a thermoplastic ethylene.

The seal 12 protrudes beyond the frame 11 with projections 13 which can also be denoted as lips, in the direction of the steering housing 8, with the result that the projections 13 bear sealingly against the steering housing 8 with their free ends. The seal system 9 is therefore sealed with respect to the steering housing 8.

The frame 11 has a guide channel 14. The guide channel 14 extends from its insertion opening 16 in the exemplary embodiment shown from the lower plane of the drawing in a manner which extends obliquely upward in the direction of the line X. The guide channel 14 opens into a receiving region 17 which is of substantially square configuration as viewed in the side view.

A lower wall 18 (as viewed in the plane of the drawing) of the guide channel 14 merges at its upper end 19 into a substantially horizontal wall section 21 which merges into a wall section 22 which is inclined in the opposite direction with respect to the lower wall 18. The inclined wall section 22 extends from the horizontal wall section 21 in a manner which is inclined in the direction of the lower plane of the drawing and in the direction of the line X, and merges into a lower, horizontal wall section 23 of the receiving region 17. The inclined wall section can also be denoted as a locking element 24 and forms an elevation or step as it were.

In order to assemble the seal system 9 on the steering housing 8, the lug 10 is guided through the guide channel 14 to the receiving region 17, the lug 10 being inserted into the receiving region 17 over the elevation or step. After the elevation or step is passed, the lug 10 is received in the receiving region 17 in a readily discernible manner, for example in an audible manner. Here, the lug 10 bears with a part of its circumference against the locking element 24 in a setpoint position, as a result of which it is readily conceivable that the locking element 24 prevents undesired release of the lug 10 from the receiving region 17. The seal system 9 is therefore connected to the steering housing 8 in a frictionally locking manner. For connection, the seal system 9 is plugged onto the steering housing 8 and is correspondingly rotated positively so as to follow the profile of the guide channel 14. A free space to the wall of the receiving region 17 is formed above the lug 10, with the result that there is sufficient space for the desired release of the frictionally locking connection.

The second lug 10 which is configured differently from the lug 10 which is shown, for example with a greater diameter, is arranged on that side of the steering housing 8 which is not shown or concealed. Of course, the seal system 9 has a guide channel 14 which is adapted to it and has a receiving region 17 which has a locking element 24 of corresponding configuration.

The frame 11 therefore represents a bulkhead or sprayboard seal which can be plugged onto the lug 10 and rotated, with the result that the lug 10 can be fixed in it. As a result of the fact that two lugs 10 which preferably lie directly opposite one another and are of different configuration and correspondingly configured guide channels are provided, the seal system 9 can be connected to the steering housing 8 only in a single predefined position and direction. The seal system 9 extends from the steering housing 8 in the direction of the bulkhead 6 or of the sprayboard and is connected to the latter here in a suitable manner, for example, adhesively bonded.

FIG. 4 shows a sectional view along the line X-X from FIG. 3.

Figure 5:
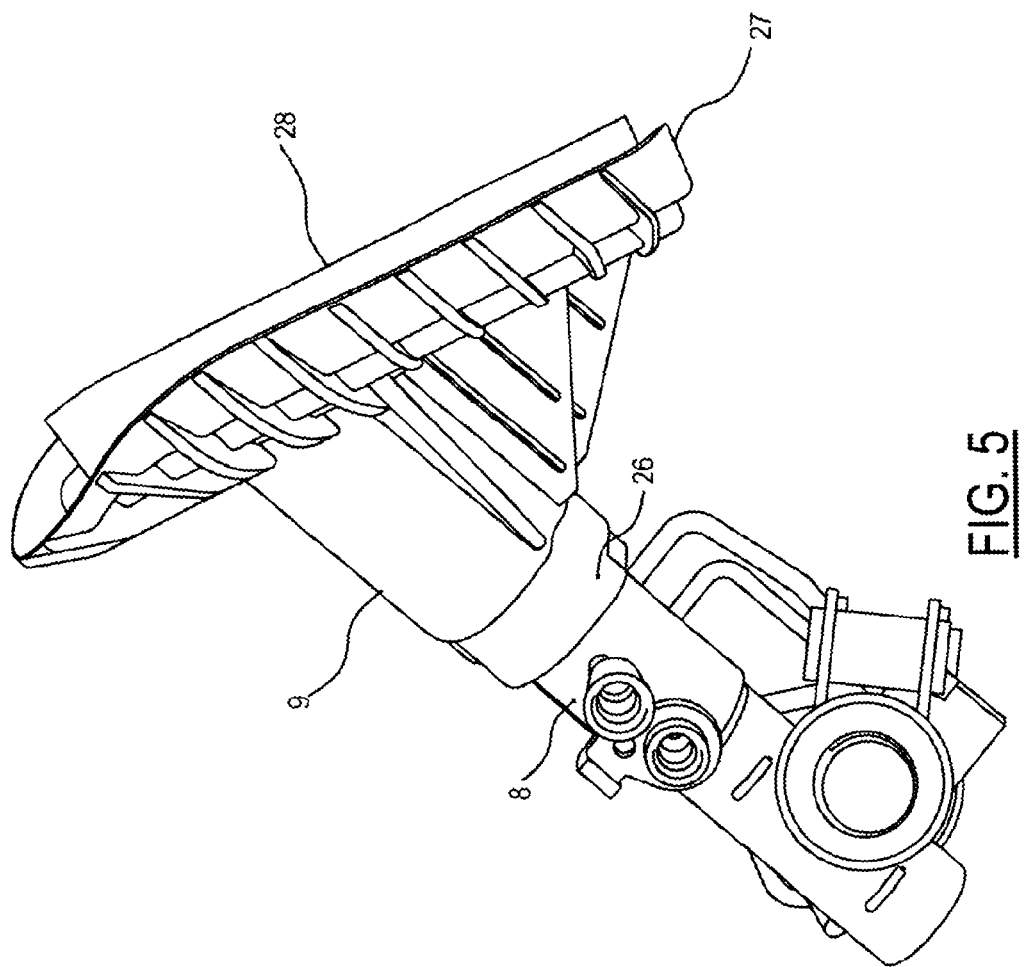
FIG. 5 shows a perspective side view of the seal system of the inventive subject matter in the assembled state.

FIG. 5 shows that the seal system 9 extends, for example, substantially in a funnel-shaped manner from the steering housing 8 in the direction of the bulkhead which is not shown in FIG. 5, in order to seal the opening here against environmental influences. It can be gathered from FIG. 5 that the seal system 9 has a fastening region 26 which is adapted to the steering housing 8 and a bearing region 27 which is adapted to the opening 4. The guide channels 14 which are adapted to the lugs 10 are arranged in the fasting region 26 and are not shown in FIG. 5. A type of sealing lip 28 which protrudes beyond the seal system 9 somewhat to the top may be arranged in the bearing region 27. The seal system 9 can engage sealingly into the opening 4 with the sealing lip 28 or may bear sealingly against its circumference. It is conceivable that the sealing lip 28 is of flexible or resilient configuration.

Referring again to FIG. 4, the seal system 9 is connected to the lug 10 or to the steering housing 8 under prestress, as it were, by means of the interaction of the lug or lugs 10 with the seal system 9 or with the locking element 24, with the result that, as it were, "constant pressure fastening" of the sprayboard seal with respect to the steering housing 8 is provided, which fastening is more robust with regard to necessary tolerances than known pressed-on solutions.

It is considered to be the main function that the engine compartment of the motor vehicle is sealed sufficiently with respect to the interior space, for example against water or heat. Furthermore, the advantageous refinement permits possible improvements if the motor vehicle is used, for example, off road noise loadings being reduced additionally.

Furthermore, it is advantageous that no relative movements of the sprayboard seal with respect to the pinion shaft 3 occur. This is because the pinion shaft 3 is surrounded completely by the seal system 9 in the engine compartment as indicated in FIG. 5 where the seal system 9 completely encloses the pinion shaft (not shown). Seen in this way, the pinion shaft 3 and the seal system 9 are divided from one another, with the result that sealing with respect to a rotating component (pinion shaft 3) is dispensed with. Furthermore, it is favorable that the refinement according to the invention is capable of absorbing dynamic relative movements of the steering gear with respect to the vehicle body. For example, tensile forces, compressive forces and rotational forces can be absorbed, without the sealing action being impaired.

It is also advantageous that the sprayboard seal remains at its originally installed location even after a long service life of the motor vehicle, unless inspections require it to be changed.

As a result of the interaction of the lug 10 or the lugs with the seal system 9 or the guide channel 14, the seal system 9 can be connected to the steering housing 8 in a manner which can be plugged on and rotated easily, a sufficient connection which is secured against undesired release being made available even in the case of preassembly. To this extent, the seal system 9 can be premanufactured with the steering housing 8 at an external location and transported to the assembly location as one unit.

It is expedient in the context of the invention if the steering housing is assigned in each case one lug on sides which lie diametrically opposite one another. The lugs have a height of from preferably two to three millimeters, it preferably being possible for the dimensions of the two lugs to be configured differently. For example, the lugs can be of cylindrical configuration with different diameters and different heights. It goes without saying that there would also be a second guide channel in the case of two lugs, which second guide channel is adapted to the respective design of the corresponding lug. The different design of the lugs and guide channels ensures that the seal system can be connected to the steering gear in a single assembly position in interaction with the correspondingly adapted guide channel. This is advantageous, since the opening in the bulkhead is usually of oval or rotationally asymmetrical configuration. This is allowed for by the single possible assembly position, with the result that the opening through the seal system is always covered.

It is favorable in the context of the invention if the seal system has a frame which is surrounded by a seal. Here, the seal is preferably applied to the frame by injection molding technology. The seal is composed, for example, of a rubber-like plastic and protrudes beyond the frame with projections in the direction of the steering housing. The projections can also be denoted as lips, said lips bearing against the steering housing.

In one advantageous refinement, the frame has a substantially funnel-shaped design with a fastening region and a bearing region. The fastening region is adapted to the design of the steering housing and has the guide channel, each lug of course being assigned a corresponding guide channel. The fastening region merges into the bearing region which bears sealingly against the bulkhead or can be connected in a sealing manner to the latter. It goes without saying that the bearing region is adapted to the design of the opening in the bulkhead, with the result that said opening can always be sealed sufficiently. A defined construction of the seal is possible as a result of the frame, the stability of the seal being increased with an optimum sealing action. A constant seal pressure can also be achieved between the regions which are to be sealed, independently of manufacturing tolerances.

Furthermore, it is advantageous that the seal is produced from a rubber-like plastic, preferably a thermoplastic elastomer, particularly preferably a thermoplastic ethylene. Plastics of this type are temperature-resistant with respect to the temperatures which occur in the engine compartment, that is to say in the bulkhead region, of 120° C. as long term loading and 135° C. as short term loading, and at the same time achieve a sufficient sealing action with respect to environmental influences such as moisture/water, gases, and dirt, etc. and noise or vibrations (noise vibration harshness (NVH)). A service life of the seal of, for example, more than 240 000 km driven by the motor vehicle can be achieved, the seal system being fixed on the steering housing over the entire service life of the motor vehicle in a positionally stable manner, that is to say in a manner which is secured against slipping, and always sealing the opening sufficiently.

Furthermore, it is advantageous if the frame is produced from a hard plastic or lightweight metal, particularly preferably aluminum or a combination thereof.

It is also advantageous that the guide channel or the guide channels has/have in each case the locking element, as a result of which the lug or lugs is/are held in a positionally fixed manner after a setpoint position is reached within the receiving region, and it is possible to apply the seal in a defined manner, since overshooting of the locking element can be perceived, for example heard, by the assembly person.

A sealing action for the opening which damps vibrations, eliminates environmental influences and overcomes the disadvantages which have been mentioned for the abovementioned prior art is provided in a simple and reliable way by means of the design according to the invention.

It is advantageous if the steering housing is a metal housing which is particularly preferably a steel integral housing. The at least one lug can be arranged on housings of this type in a simple way. The at least one lug is advantageously a pin which is situated on the steering housing, is particularly preferably an integral constituent part of the steering housing and is produced by deep drawing. Low maintenance connections in conjunction with the seal can be produced by the deep drawing, which connections ensure that the service life of the components is also designed for long operating times or kilometer readings of the motor vehicles.

Further advantageous refinements of the invention are disclosed in the subclaims.

What is claimed is:

1. A system for sealing an opening to an engine compartment of a motor vehicle that receives a steering housing, the system comprising:
   a frame having at least one guide channel opening into a receiving region for receiving at least one lug which is arranged on the steering housing;
   a seal surrounding the frame and connected in a frictionally locking manner to the steering housing by way of a locking element in the receiving region.

2. The system as claimed in claim 1, wherein the steering housing has a lug on two diametrically opposing sides of the steering housing.

3. The system as claimed in claim 2 wherein the seal has projections protruding beyond the frame and bearing against the steering housing.

4. The system as claimed in claim 3 further comprising:
   a fastening region adapted to attach to the steering housing and having a guide channel that cooperates with the receiving region; and
   a bearing region merging with the fastening region and substantially adapted to attach to the at least one guide channel opening.

5. The system as claimed in claim 4, wherein the two lugs have different dimensions with respect to one another, the two lugs having correspondingly adapted guide channels, whereby the system is connected to the steering housing in a positionally stable manner in a single assembly position.

6. The system as claimed in claim 1, wherein the seal is composed of a flexible plastic.

7. The system as claimed in claim 1, wherein the frame consists of a hard plastic.

8. A seal system for sealing an opening to an engine compartment of a motor vehicle, the opening being adapted to receive a steering housing, the seal system comprising:
   a frame having at least one guide channel opening into a receiving region for receiving at least one lug which is arranged on the steering housing;
   a seal surrounding the frame and connected in a frictionally locking manner to the steering housing by way of a locking element in the receiving region
   a fastening region adapted to attach to the steering housing and having a guide channel that cooperates with the receiving region; and
   a bearing region merging with the fastening region and substantially adapted to attach to the at least one guide channel opening.

9. The seal system as claimed in claim 8, wherein the steering housing has a lug on two sides of the steering housing which lie diametrically opposite one another.

10. The seal system as claimed in claim 9 wherein the seal has projections protruding beyond the frame, and the projections bear against the steering housing.

11. The seal system as claimed in claim 10, wherein the two lugs have different dimensions with respect to one another, the two lugs are each received by a correspondingly adapted guide channel, whereby the seal system is connected to the steering housing in a positionally stable manner in a single assembly position.

12. The seal system as claimed in claim 11, wherein the seal is composed of a flexible plastic.

13. The seal system as claimed in claim 11, wherein the frame consists of a hard plastic.

14. The seal system as claimed in claim 8 wherein the seal has projections protruding beyond the frame, and the projections bear against the steering housing.

15. An apparatus for sealing an opening to an engine compartment of a motor vehicle, the opening being adapted to receive a steering housing, the seal system comprising:
   a frame having at least one opening into a receiving region for receiving at least one lug which is arranged on the steering housing;
   a seal surrounding the frame and connected in a frictionally locking manner to the steering housing by way of a locking element in the receiving region
   a fastening region adapted to attach to the steering housing and having a guide channel that cooperates with the receiving region; and
   a bearing region merging with the fastening region and substantially adapted to attach to the opening in the frame.

16. The apparatus as claimed in claim 15 wherein the seal has projections protruding beyond the frame and bearing against the steering housing.

17. The apparatus as claimed in claim 16, wherein the seal is composed of a flexible plastic and the frame consists of a hard plastic.

18. The apparatus as claimed in claim 17 further comprising a lug on two sides of the steering housing lying diametrically opposite one another, the two lugs having different dimensions with respect to one another, the two lugs are each received by a correspondingly adapted guide channel, whereby the seal system is connected to the steering housing in a positionally stable manner in a single assembly position.

* * * * *